(12) United States Patent
Partee et al.

(10) Patent No.: US 9,805,760 B2
(45) Date of Patent: Oct. 31, 2017

(54) READING DATA ON A STORAGE MEDIUM USING MAGNETIZATION MAP (71) Applicant: HEWLETT PACKARD ENTERPRISE DEVELOPMENT LP, Houston, TX (US)

(72) Inventors: Charles Calvin Brooks Partee, Boulder, CO (US); Mike Alan Holmberg, Boise, ID (US); John D Hampton, Boise, ID (US); Scott Swanbeck, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/120,963

(22) PCT Filed: Apr. 21, 2014

(86) PCT No.: PCT/US2014/034842
§ 371 (c)(1),
(2) Date: Aug. 23, 2016

(87) PCT Pub. No.: WO2015/163847
PCT Pub. Date: Oct. 29, 2015

(65) Prior Publication Data
US 2016/0365111 A1 Dec. 15, 2016

(51) Int. Cl.
*G01B 5/02* (2006.01)
*G11B 20/10* (2006.01)
(Continued)

(52) U.S. Cl.
CPC .... *G11B 20/10305* (2013.01); *G11B 5/00878* (2013.01); *G11B 5/02* (2013.01);
(Continued)

(58) Field of Classification Search
None
See application file for complete search history.

(56) References Cited

U.S. PATENT DOCUMENTS 5,276,566 A 1/1994 Clifford, Jr.
5,365,333 A 11/1994 Wirth et al.
(Continued)

FOREIGN PATENT DOCUMENTS

EP 0919990 A2 6/1999
JP 2006202425 A 8/2006

OTHER PUBLICATIONS

International Search Report & Written Opinion received in PCT Application No. PCT/US2014/034842, dated Jan. 14, 2015, 9 pages.
(Continued)

*Primary Examiner* — Tan X Dinh
(74) *Attorney, Agent, or Firm* — Lakshmi Kumaran & Sridharan (57) ABSTRACT

To read data from a storage medium, a magnetization map of the data stored on at least one portion of the storage medium is obtained. The magnetization map is analyzed to obtain intermediate data corresponding to the data stored on the at least one portion of storage medium. Further, the intermediate data is converted into the user data based on format emulation of a data storage format of the storage medium. The conversion of the intermediate data includes decrypting the intermediate data to obtain the user data.

20 Claims, 6 Drawing Sheets (51) Int. Cl.
*G11B 5/02* (2006.01)
*G11B 20/12* (2006.01)
*G11B 20/18* (2006.01)
*G11B 27/36* (2006.01)
*G11B 5/584* (2006.01)
*G11B 5/008* (2006.01)

(52) U.S. Cl.
CPC .............. *G11B 20/10* (2013.01); *G11B 20/12* (2013.01); *G11B 20/1262* (2013.01); *G11B 20/18* (2013.01); *G11B 5/00813* (2013.01); *G11B 5/584* (2013.01); *G11B 27/36* (2013.01)

(56) References Cited

U.S. PATENT DOCUMENTS

| | | | |
|---|---|---|---|
| 6,902,128 B2 | 6/2005 | Kuhar | |
| 7,177,108 B2 * | 2/2007 | Payne | G06F 3/0607 360/69 |
| 7,224,545 B2 * | 5/2007 | Saliba | G11B 5/00813 360/48 |
| 8,484,412 B2 * | 7/2013 | Bates | G11B 15/026 360/69 |
| 8,699,174 B2 * | 4/2014 | Kinney | G11B 5/584 360/77.12 |
| 8,717,698 B2 * | 5/2014 | Nylander-Hill | G11B 20/18 360/31 |
| 2011/0199703 A1 | 8/2011 | Hansen et al. | |
| 2011/0228421 A1 | 9/2011 | Watanabe | |
| 2012/0106004 A1 | 5/2012 | Deckers et al. | |
| 2013/0229725 A1 | 9/2013 | Bordynuik | |
| 2014/0126083 A1 | 5/2014 | Holmberg et al. | |

OTHER PUBLICATIONS

Jaquette, G.A., et al., "LTO: A Better Format for Mid-range Tape," (Research Paper), IBM Journal of Research and Development 47.4, Jul. 2003, pp. 429-444, available at http://ieeexplore.ieee.org/stamp/stamp.jsp?tp=&arnumber=5388955.

* cited by examiner

READING DATA ON A STORAGE MEDIUM USING MAGNETIZATION MAP

BACKGROUND

Driven by the demand for ever-increasing amount of information storage in ever-decreasing volume, areal density or surface density of magnetic storage mediums, such as magnetic disks and magnetic tapes, continues to increase. The increase in areal density may be achieved through concomitant increase in linear density and track density of the stored information.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Mostly, storage devices, such as a tape drive or a disk drive, are designed to read data stored at the areal density, e.g., track density and linear density, of a current generation of a storage medium, such as a magnetic tape or a magnetic disk. Currently, if a user has a magnetic disk drive of a certain generation and specific format, the user would have to use that disk or a corresponding disk drive of the same generation and format to read the magnetic disk. In case of magnetic tape drives, some limited backward compatibility may be provided, for example, a tape drive may be able to write the current generation and the previous generation, and it may be able to read the current generation and two previous generations. Specifically, Linear Tape Open (LTO) tape drives provide two generations backward read and one generation backward write capability, in addition to the present generation read and write capabilities. For example, a 6th generation LTO tape drive can write on a 5th generation LTO magnetic tape and read a 5th generation and a 4th generation LTO magnetic tape.

Typically, the magnetic tapes have a very long life time, such as over 30 years. In addition, new generations of tape drives are introduced every few years. In order to read data stored on an older generation of magnetic tape, that is no longer supported by the current generation of drives, a user may either have to transfer the data to a current generation magnetic tape or maintain an ever-growing library of older generation tape drives to read the old generation magnetic tape. In order to create storage devices that are backward compatible with previous generation storage mediums, additional hardware components are designed and included in current generation storage devices, which may add cost and development time. Inclusion of additional hardware and components may also limit maximum areal density that may be achieved for that current generation in absence of backward compatibility.

Further, each successive generation may provide a significantly higher linear and track density by, among other factors, using smaller and smaller media particles to store the data. As the linear density increases, a head of the tape drive may have to be re-designed to operate at higher density. For example, LTO-7 tape drives are embedded with narrower heads, such as in the range of 2 microns in width, for reading higher density tracks, than a head for LTO-3 tape drive, which has a width in the range of about 15 microns. Accordingly, the head of the LTO-7 tape drive is more sensitive than the head for the LTO-3 tape drive. Therefore, a head that may be designed for a narrow track with small media particles may not be suited for reading a wide track with larger media particles. As new generation storage devices are generally not configured to read old formats, the new generation storage devices cannot directly read old generation storage mediums. Further, onboard hardware of the LTO tape drives, for example, facilitate the tape drives to read data, from one or two previous generation formats of the storage mediums, however the LTO tape drives are not configured to directly read formats that are older than two generations.

According to an example of the present subject matter, a system and a method for reading data from a storage medium are described. In this respect, the system as described herein is a magnetic media scanning device that communicates with a backward compatible data reader, hereinafter referred as a data reader, for reading data from a storage medium, such as a magnetic tape, regardless of generation of the storage medium. The data reader may be a part of the magnetic media scanning device or may reside in a separate computer system.

In accordance with an example of the present subject matter, the magnetic media scanning device may include magnetization sensors that detect magnetization of a storage medium. Further, the magnetic media scanning device may include a magnetic media transport for moving the storage medium across the magnetization sensors. When the magnetic tape is moved by the magnetic media transport, the magnetization sensors may generate a magnetization map of data stored on the storage medium. The data may include user data as well as overhead data. The user data may be understood as the data that is of relevance to a user. Further, the magnetization map may be understood as a vector map depicting magnitude and direction of magnetization of the storage medium. The magnetization map may be generated using any suitable technique for measuring magnetization. Some examples of the techniques include, but are not limited to, magnetic force microscopy, magnetometers, magnetic probe arrays, inductive transducers or arrays, magneto-resistive transducers or arrays, magneto-optic Kerr effect, or surface magneto-optic Kerr effect microscopy.

In an example, the storage medium may be a magnetic tape about 12.5 mm wide and 1 km long, and the magnetization map may be a Cartesian map of the magnetization vector vs. the x and y position. In another example, the storage medium may be a circular disk, say, 6.2 mm in radius, in this case, the magnetization map may be a radial map of the magnetization vector vs. radial (r) and circumferential (θ) position. Thus, for each x-y or r-θ point in the magnetization map, there is a corresponding magnetization vector, composed of magnitude and direction, associated therewith.

The magnetic media scanning device may measure the magnetization vector at a given point and can facilitate in moving the storage medium and the magnetization sensor relative to each other to generate the magnetization map over a surface of the storage medium. In an example, the magnetization sensors may scan the surface of the storage medium by taking multiple samples of the storage medium. The sampling rate for generating the magnetization map is directly related to the areal density of the data stored. For example, in case of a magnetic tape having high areal density, the sample rates for resolving the data pattern on the magnetic tape would be high. Once the magnetization sensors have scanned the storage medium, the magnetic media scanning device may combine all the scans for different samples to generate the magnetization map that indicates magnetic transitions on the storage medium. The magnetic transitions may be understood as change in magnetic state or change in pattern of data that may be written on the storage medium.

In an example, the magnetization map for a given storage medium may be generated by more than one method or magnetization sensor. The storage medium may include servo data as well as user data. The servo data may be understood as the data that may be pre-written on a storage medium. For example, servo data may be read by one method, such as a magneto-resistive sensor, and rest of the data may be read by another method, such as a magnetic probe array. In another example, a hybrid approach may be employed for generation of the magnetization map. The hybrid approach may be understood as a technique where part of the storage medium may be read back in real time by the head of the storage device and other parts of the storage medium may be read back by generating the magnetization map of that portion of the storage medium. Once generated, the magnetization map, or portions of the magnetization map, can be processed further as discussed below.

In an implementation, the magnetization vector pattern captured in the magnetization map may be analyzed by the data reader as a function of location to identify locations of transitions between one magnetization direction and the alternative direction of magnetization. The presence or absence of a transition at a given location represents the data bits. This pattern of transitions is subjected to post-processing by a format emulator that converts the varying pattern of transitions to digital 1's and 0's, hereinafter referred to as intermediate data. The intermediate data may be understood as the digital data that is still in the format corresponding to the generation of the storage medium. This intermediate data is further analyzed by the format emulator to extract overhead and user data, in accordance with a format of the data that was used for that generation of the storage medium. By performing the post-processing and format emulation, many more formats and generations can be supported than would be practicable in hardware.

To process the intermediate data for retrieving the user data, the data reader may communicate with the magnetic media scanning device to determine a generation of the storage medium which is to be read. This generation of the storage medium may be indicated to the magnetic media scanning device by a user, a radio frequency identification (RFD) cartridge memory on an LTO tape, or successive analyses of the magnetic map using different formatters until the correct format is found. For example, the correct format may be the one that produces identifiable overhead data that matches one of the formats supported by the data reader. Depending on a format of the generation of the storage medium, the data reader can run the intermediate data through the format emulator to extract the user data. This user data may then be provided to the user. In an example, the data reader may be configured to extract user data from different formats of the storage medium by using corresponding format emulators. The user data may be later loaded onto a storage device, for example a current generation storage device, for near real-time access to the user data without using the data reader.

Accordingly, in one example, the data reader may be configured to read all previous generations of storage mediums. The data reader may help in eliminating undesirable addition of new hardware components in the storage device, which in turn saves cost. Further, in case of LTO, the data reader of the present subject matter does not violate the two generation backward read agreement of the LTO tape drives as the data reader does not read directly from the storage medium and in real-time. Further, the backward read capability is accomplished substantially in a separate computing system and not implemented in a tape drive. Further, the data reader may facilitate the users to write the data on a current generation storage medium that can be read using a current generation storage device in near real-time.

The various systems and the methods are further described in conjunction with the following figures. It should be noted that the description and figures merely illustrate the principles of the present subject matter. Further, various arrangements may be devised that, although not explicitly described or shown herein, embody the principles of the present subject matter and are included within its scope.

The manner in which the systems and the methods for reading data from a storage medium are implemented are explained in detail with respect to FIG. 1A, FIG. 1B, FIG. 1C, FIG. 2A, FIG. 2B, and FIG. 3. While aspects of described systems and methods for reading data from a storage medium can be implemented in any number of different computing systems, environments, and/or implementations, the examples and implementations are described in the context of the following system(s).

Figure 1A:
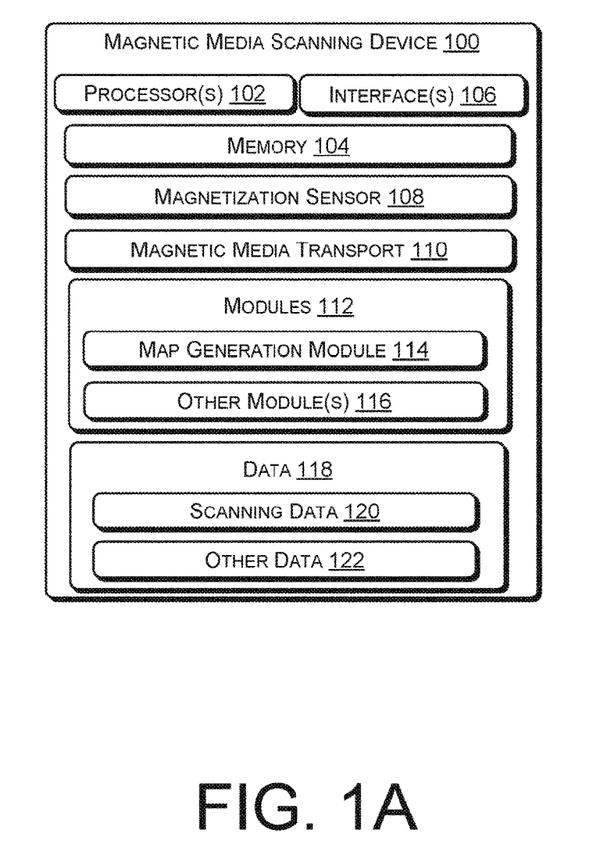
FIG. 1A illustrates components of a magnetic media scanning device, according to an example of the present subject matter.
Figure 1B:
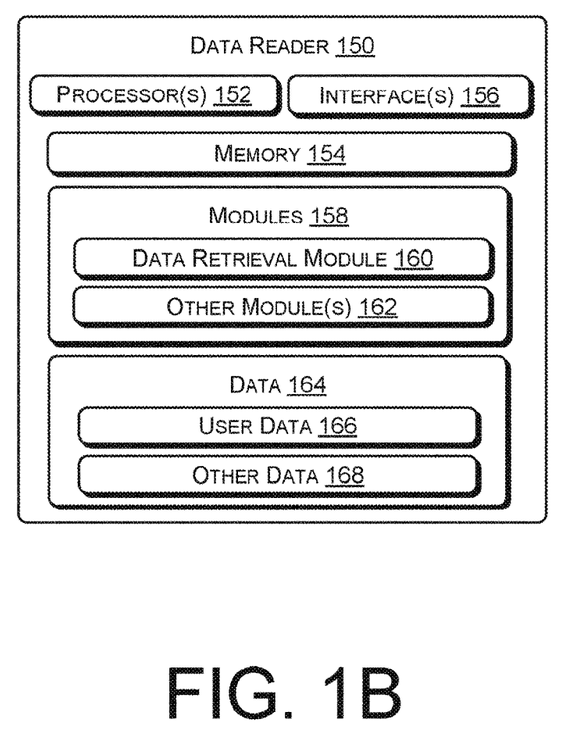
FIG. 1B illustrates components of a backward compatible data reader, according to an example of the present subject matter.

FIGS. 1A and 1B illustrate a magnetic media scanning device 100, hereinafter referred to as a scanning device 100 and a backward compatible data reader 150, hereinafter referred to as a data reader 150, according to different examples of the present subject matter. In one example, the scanning device 100 and the data reader 150 may be implemented in any data storage network environment comprising a variety of devices including routers, servers, storage devices, etc. In an example, the data reader 150 may be implemented on a stand-alone computing system or a network interfaced computing system. The computing system can include, but are not restricted to, desktop computers, laptops, smart phones, personal digital assistants (PDAs), tablets, and the like. Further, the scanning device 100 may be connected to the data reader 150 either directly or over a network.

In an example, the scanning device 100 and the data reader 150 may include a processor 102 and a processor 152 respectively. Further, the scanning device 100 and the data reader 150 may include a memory 104 and 154 connected to the processors 102 and 152 respectively. The memory 104 and 154, communicatively coupled to the processor 102 and 152, can include any non-transitory computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

The scanning device 100 and the data reader 150 also include interface(s) 106 and 156 respectively. The interfaces 106 and 156 may include a variety of interfaces, for example, interfaces for user device(s), storage devices, and network devices. The user device(s) may include data input and output devices, referred to as I/O devices. The interface(s) 106 and 156 facilitate the communication of the scanning device 100 and the data reader 150 with various communication and computing devices and various communication networks, such as networks that use a variety of protocols, for example, Hypertext Transfer Protocol (HTTP) and Transmission Control Protocol/Internet Protocol (TCP/IP).

Further, the scanning device 100 may include at least one magnetization sensor 108 and a magnetic media transport 110. The at least one magnetization sensor 108 may sense the magnetization of the storage medium, such as a magnetic tape. The magnetic media transport 110 may move the magnetic tape across the at least one magnetization sensor 108. For example, the magnetic media transport 110 may include a platform (not shown) that is moveable in x and y or r and θ direction. In an example, the platform may be sufficient in size to support the entire storage medium, such as a magnetic disk. In case of a magnetic tape, the platform may be sufficient to support a portion of the magnetic tape that is being sensed. Additional portions of the magnetic tape may be moved onto the platform periodically by a roller mechanism. In another example, for reading an older generation tape, the scanning device 100 may use a tape transport mechanism from an existing tape drive to move the tape past the magnetization sensors 108.

The scanning device 100 and the data reader 150 may further include modules 112 and 158 respectively. In some examples, the modules 112 and the modules 158 may include processor executable instructions to perform particular tasks, objects, components, data structures, functionalities, etc., to implement particular abstract data types, or a combination thereof. In some examples, the modules 112 and the modules 158 may be implemented as signal processor(s), state machine(s), logic circuitries, and/or any other device or component that manipulates signals based on operational instructions. Further, the modules 112 and the modules 158 can be implemented by hardware, by computer-readable instructions stored on a non-transitory computer-readable medium and executable by a processing unit, or by a combination thereof.

In an implementation, the modules 112 include a map generation module 114 and other module(s) 116. Further, the modules 158 include the data retrieval module 160 and other modules(s) 162. The other module(s) 116 and 162 may include programs or coded instructions that supplement applications or functions performed by the scanning device 100. The modules 112 and 158 may be implemented as described in relation to FIGS. 1A, 1B, and 1C.

In an example, the scanning device 100 includes data 118 and the data reader 150 includes data 164. The data 118 may include scanning data 120 and other data 122. Further, the data 164 may include user data 166 and other data 168. The other data 122 and 168 may include data generated and saved by the modules 112 and 158 for implementing various functionalities of the scanning device 100 and the data reader 150. As mentioned above, the scanning device 100 may be implemented in a computing system, such as a server, a desktop, or a laptop. In an example, the data reader 150 may be implemented in the scanning device 100. In another example, the data reader 150 may reside in a separate computing system (not shown) and may be connected to the scanning device 100 either directly or over a network.

When a storage medium is loaded in the scanning device 100, the scanning device 100 may detect presence of the storage medium therein. For example, tape cartridges include a cartridge memory that may include information about the generation of the magnetic tape. The scanning device 100 may communicate with the cartridge memory to determine the generation of the storage medium that may be loaded in the scanning device 100. Based on the detection, the map generation module 114 may instruct the at least one magnetization sensor 108 of the scanning device 100 to generate a magnetization map of data stored on the storage medium.

In an implementation, upon receiving the instructions from the map generation module 114, the magnetic media transport 110 may facilitate in moving the storage medium and the at least one magnetization sensor 108 relative to each other to generate the magnetization map over a surface of the storage medium. The magnetization map may be understood as a map of magnetization vectors indicating magnitude and direction of a plurality of magnetization vectors on the storage medium. The magnetization map may be generated by a plurality of methods, such as magnetic force microscopy, magnetometers, magnetic probe arrays, inductive transducers, magneto-resistive transducers, magneto-optic Kerr effect, and surface magneto-optic Kerr effect microscopy.

In an example, a magnetic force microscope (MFM) may be used for reading data from the storage medium. The data may include user data and overhead data, such as servo data. The user data may be understood as the data that is of relevance to a user. Further, the overhead data may be understood as the data that facilitates in storage and retrieval of the user data on the storage medium. In the above example, the storage medium, such as a magnetic tape, may be secured to a stage beneath a tip of the MFM and the stage may move the magnetic tape in small steps in x and y direction, at a desired step size, while the at least one magnetization sensor 108 scans the magnetic tape for generation of the magnetization map.

For example, considering a scenario where an LTO-3 tape is loaded in a LTO-7 tape drive, the map generation module 114 may instruct the magnetization sensor 108 to scan the LTO-3 tape by taking multiple samples. In one scenario, the map generation module 114 may instruct the magnetization sensor 108 to scan the LTO-3 tape in 2 micron steps. As noted previously, an LTO-3 tape has a track in the range of 15 microns wide, so the magnetization sensor 108 may therefore take multiple steps to complete the scanning of a single track of the LTO-3 tape. Accordingly, the magnetization sensor 108 may generate multiple scans of the LTO-3 tape that may be later combined to form the magnetization map.

In an example, the magnetization map of a tape may be generated by employing more than one magnetization method. For example, the servo data of the storage medium may be read by a magneto-resistive sensor and remaining data from the storage medium may be read by magnetic probe array. The scanning device 100 may employ more than one mechanism or sample rate for measuring magnetization. If the format of the storage medium to be analyzed has narrow tracks, such as LTO-7 or later generations, the scanning device 100 may use magnetic force microscopy and sample the data at a high resolution. If the format of the storage medium to be analyzed has wider tracks, such as LTO-3, the scanning device 100 may use magnetic force microscopy at a lower resolution for faster processing speed. In an example, the scanning device 100 may employ magnetization sensors of the order of an LTO-7 tape head, such as having a width of 2 microns, scanning in, say, 5 micron steps. The magnetization measurement method and sample rate selected by the scanning device 100 for a given format may be selected to maximize data throughput while maintaining an acceptable error rate given whatever magnetization sensors are implemented in the particular scanning device 100.

In an alternative example, the map generation module 114 may instruct the scanning device 100 to read some of the data from the storage medium in real time and may instruct the scanning device 100 to generate the magnetization map for the remaining data. For example, if an older generation tape is being read and some of the overhead data, such as the servo data, is still readable by a current generation of the tape head sensor and some of the data, such as the user data and header data is not directly readable by the current generation of tape head sensor, then the scanning device 100 may use the current generation tape head as the magnetization sensor 108, read back and analyze the servo data from the storage medium in real time and may use the tape head sensors to scan the non-servo regions on the tape and generate a partial magnetization map.

In an implementation, the map generation module 114 may detect when a storage medium, such as a magnetic tape or a magnetic disk, is loaded in the scanning device 100. Based on the detection, the map generation module 114 may send an instruction to the magnetization sensors to generate a magnetization map of the data stored on the storage medium. In an example, if the generation of the storage medium is a current generation or a previous generation that is supported by current devices, the scanning device 100 may include current generation electronics and sensors that allow the magnetization sensors 108 to read the data directly from the storage medium instead of generating the magnetization map.

In case the storage medium is a magnetic tape, the magnetization map may be a x-y map of the magnetization vectors. On the other hand, if the storage medium is a circular disk, the magnetization map may be a map of the radius (r) and circumferential position (θ) of the magnetization vectors. In an implementation, the magnetization map may be created by using a magnetic imaging technique. Examples of the magnetic imaging technique includes, but not limited to, magnetic force microscopy, magnetometers, magnetic probe arrays, inductive transducers, magneto-resistive transducers, magneto-optic Kerr effect, and surface magneto-optic Kerr effect microscopy.

In an implementation, the magnetization sensors 108 may scan the storage medium in samples. For example, as old generation storage mediums are provided with wider tracks, i.e., the old generation storage mediums have less areal density, the map generation module 114 may facilitate the magnetization sensors to scan the data stored on the storage medium in samples. Considering a scenario, where data is written on a LTO-3 tape such that the LTO-3 tape has a track pitch of about 15 microns, the map generation module 114 may instruct the magnetization sensor to scan the LTO-3 tape in parts, such as in samples of 2 microns. In this respect, the scanning device 100 may create multiple scans, based on the number of samples. In an example, the map generation module 114 may instruct the magnetization sensor to take steps of 0.5 microns or 5 microns, in a cross-track direction, depending on how fine the magnetization map is to be created. The map generation module 114 may store information pertaining to the magnetization map as the scanning data 120.

Referring to FIG. 1B, upon generation of the magnetization map, the scanning device 100 may store the magnetization map for further processing. In an example, the magnetization map may be transferred to the data reader 150 for processing and data retrieval by format emulation. As mentioned above, the data reader 150 may be a part of the scanning device 100 or may reside in a separate computing system. Accordingly, the data retrieval module 160 of the data reader 150 may analyze the magnetization map as a function of location to identify the locations of transitions between one magnetization direction and an alternative magnetization direction. The presence or absence of a transition at a given location in the magnetization map indicates the presence or absence of a bit. Once the transitions are identified, the data retrieval module 160 may analyze the transitions to convert plurality of bits of the magnetization map into bytes to obtain intermediate data. Thereafter, the data retrieval module 160 may apply error correction codes (ECC) to the intermediate data of the magnetization map. The ECC enables detection and correction of any errors which might have been introduced during transformation in the intermediate data.

Thereafter, the data retrieval module 160 may extract the user data from the intermediate data derived from the magnetization map. In an implementation, the data retrieval module 160 may detect presence of the overhead data in the intermediate data. In magnetic tapes, examples of the overhead data may include, but not limited to, servo data that provides location of the user data on the magnetic tape to a tape drive, header information that indicates the tape drive what file on the magnetic tape is being read by the tape drive, and the ECC. In addition, the data retrieval module 160 may process the intermediate data to retrieve the user data. In an example, the intermediate data includes overhead data, such as servo data, header information, and ECC. The overhead data facilitates in storage and retrieval of the user data but is not useful for a user. The data retrieval module 160 may identify the various types of data that may be stored on the storage medium.

In an example, when the data retrieval module 160 analyzes the intermediate data corresponding to servo, the data retrieval module 160 can use that data to determine what part of the medium is being analyzed. When the intermediate data corresponding to header identification is being analyzed, the data retrieval module 160 can use that data to identify the user data is adjacent to the header. When the data retrieval module 160 is analyzing the intermediate data corresponding to ECC-encoded user data, then the data retrieval module 160 can decode the ECC to correct any errors and provide the user the files that the user is retrieving. In an example, the data may be stored on the storage medium in an encrypted form. In such a case, the data retrieval module 160 may decrypt the user data after decoding the ECC data while saving the user data 166.

Accordingly, the data retrieval module 160 may identify the user data from the intermediate data and extract the same. The data retrieval module 160 may pass the intermediate data through a formatter emulator, configured to read the data belonging to the generation of the storage medium, to extract the user data. The extracted user data may be stored by the data retrieval module 160 as the user data 166. In an implementation, the user data 166 may be later written on another generation storage medium.

In an implementation, depending on a format of the generation of the storage medium, the data retrieval module 160 may run the intermediate data through a corresponding format emulator to extract the user data. This user data may be provided to the user or stored on a different storage medium. In an example, if the LTO-3 tape is loaded in the scanning device 100, the data retrieval module 160 may run the intermediate data through a LTO-3 generation format emulator to extract the user data from the intermediate data. Once extracted, the user data may be written on a new generation tape, such as an LTO-7 tape.

Figure 1C:
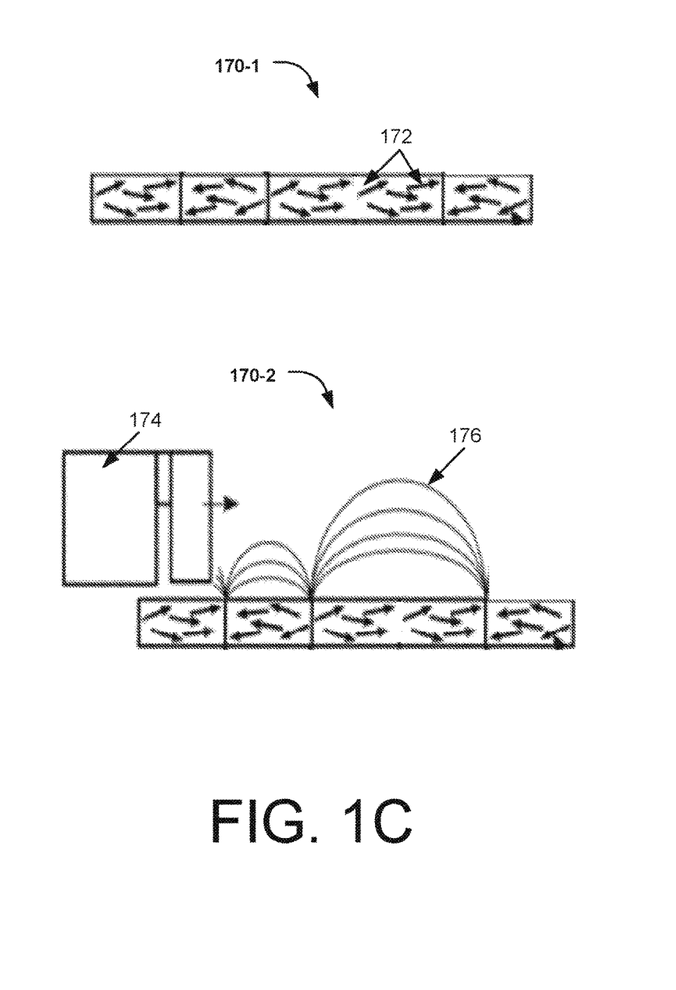
FIG. 1C illustrates magnetization patterns on a storage medium, according to an example of the present subject matter.

FIG. 1C illustrates magnetization patterns 170-1 and 170-2 of a storage medium, according to an example of the present subject matter. In the present example, the magnetization patterns 170-1 and 170-2 indicate a pattern of magnetization vectors 172 associated with the storage medium. The magnetization vectors 172 include a magnetization direction and a magnitude. The magnetization patterns 170-1 and 170-2 can be generated for a storage medium, such as a magnetic tape or a magnetic disk. Further, the storage medium, such as a tape drive or a disk drive, may be read by the at least one magnetization sensor 108 of the scanning device 100. The at least one magnetization sensor 108 may be implemented in a read head 174 of a tape drive. The at least one magnetization sensor 108 may scan the storage medium, either partially or completely, to generate a magnetization map thereof.

In an example, the magnetization map may be understood as a vector map of magnetization of the storage medium. The at least one magnetization sensor 108 determines the magnetization at a given location. In this example, the at least one magnetization sensor 108 of the storage device is determining the magnetization of the storage medium by sensing magnetic field lines 176 of the storage medium. For example, the at least one magnetization sensor 108 may identify a magnetic flux transition to detect a bit from the signals based on the identified magnetic flux transition. The identification of the magnetic flux transition may include analyzing voltage wave forms of the signal.

Figure 2A:
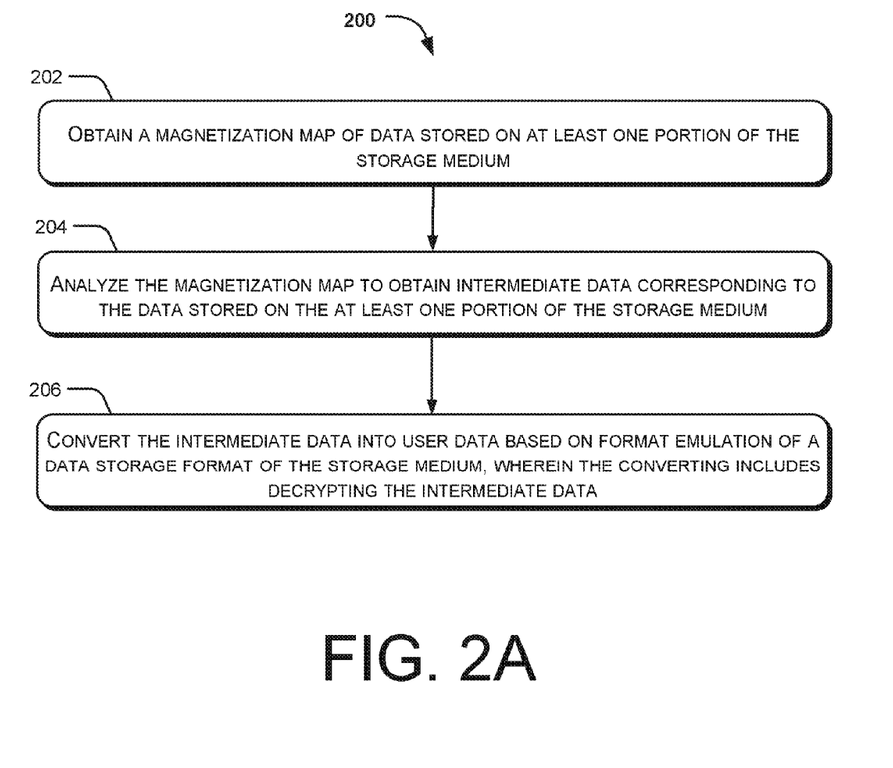
FIG. 2A illustrates a method for reading data from a storage medium, according to an example of the present subject matter.
Figure 2B:
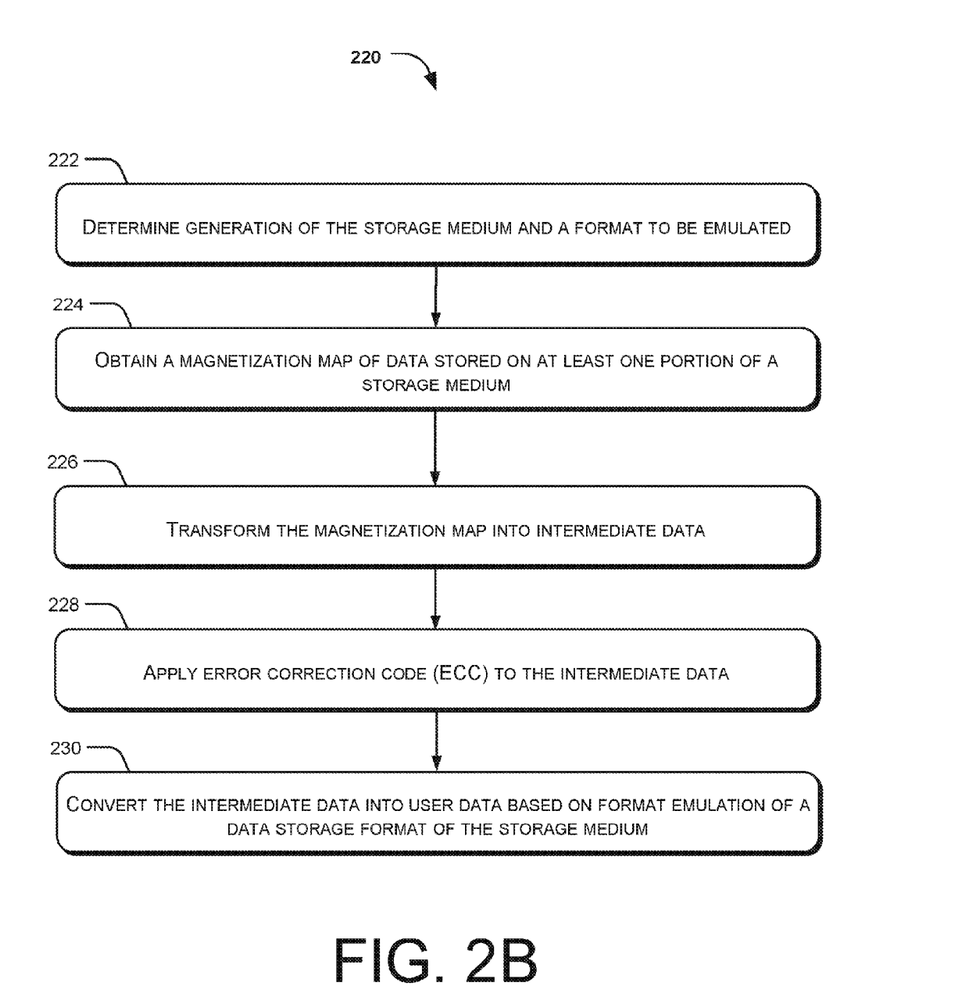
FIG. 2B illustrates a method for reading data from a storage medium, according to another example of the present subject matter.

FIGS. 2A and 2B illustrate methods 200 and 220 for reading data from a storage medium, according to an example of the present subject matter. The order in which the methods 200 and 220 are described is not intended to be construed as a limitation, and some of the described method blocks can be combined in a different order to implement the methods 200 and 220, or an alternative method. Additionally, individual blocks may be deleted from the methods 200 and 220 without departing from the spirit and scope of the subject matter described herein. Furthermore, the methods 200 and 220 may be implemented in any suitable hardware, computer-readable instructions, or combination thereof.

The steps of the methods 200 and 220 may be performed by either a computing device under the instruction of machine executable instructions stored on a computer readable medium or by dedicated hardware circuits, microcontrollers, or logic circuits. Herein, some examples are also intended to cover computer readable medium, for example, digital data storage media, which are machine or computer readable and encode machine-executable or computer-executable instructions, where said instructions perform some or all of the steps of the described methods 200 and 220.

With reference to method 200 as depicted in FIG. 2A, at block 202, the method 200 includes obtaining a magnetization map of data stored on at least one portion of a storage medium. In an implementation, the data retrieval module 160 may obtain the magnetization map of the data from the scanning device 100. In an example, the storage medium may be a magnetic tape or a magnetic disk. Further, the data includes user data and overhead data. The user data may be understood as the data that is of relevance to a user. Further, the overhead data may be understood as the data that facilitates in storage and retrieval from the user data 166 on the storage medium.

As depicted in block 204, the method 200 includes analyzing the magnetization map to identify an intermediate data stored on the at least one portion of the storage medium. In an implementation, the data retrieval module 160 may apply at least one signal processing technique on the magnetization map to transform the magnetization map into a binary format. Further, the data retrieval module 160 may apply an error correction code (ECC) to the binary format. The ECC rectifies any errors in the data.

As shown in block 206, the method 200 includes converting the intermediate data into user data 166. In an implementation, the data retrieval module 160 may convert the intermediate data based on format emulation of a data storage format of the storage medium. In an example, the data retrieval module 160 may decrypt the intermediate data before converting into the user data 166.

With reference to FIG. 2B, at block 222, the method 220 may include determining a generation of the storage medium loaded in a storage device and a format to be emulated. In an implementation, the data retrieval module 160 may determine the generation of the storage medium. The storage medium may be a magnetic tape or a magnetic disk.

As depicted in block 224, the method 220 includes obtaining a magnetization map of data stored on at least one portion of the storage medium. In an implementation, the data retrieval module 160 may obtain the magnetization map of the data stored on the at least one portion of the storage medium from the scanning device 100. In an example, the magnetization map may be generated by taking at least one sample of the data written on the storage medium.

As shown in block 226, the method 220 includes transforming the magnetization map in intermediate data. The intermediate data is indicative of a binary format of the magnetization map. In an implementation, the data retrieval module 160 may apply at least one signal processing technique on the magnetization map to transform it into the binary format.

As illustrated in block 228, the method 220 includes applying error correction codes (ECC) to the intermediate data. In an implementation, the data retrieval module 160 may apply the ECC to identify and correct any errors in the data stored as the intermediate data.

At block 230, the method 220 includes converting the intermediate data into the user data 166. In an implementation, the data retrieval module 160 may convert the intermediate data into the user data 166 by passing the intermediate data through a format emulator which can read the format of the storage medium. The user data 166 may be stored for later references.

Figure 3:
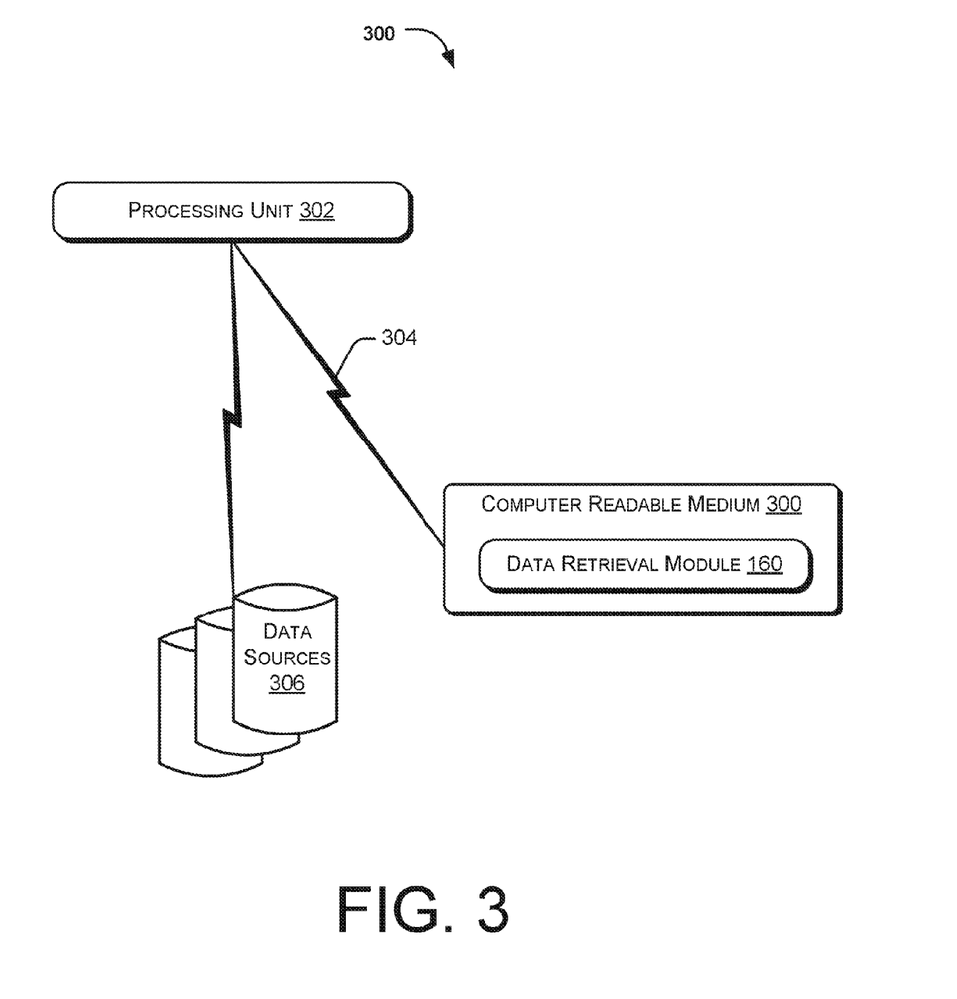
FIG. 3 illustrates a computer readable medium storing instructions for reading data from a storage medium, according to an example of the present subject matter.

FIG. 3 illustrates a computer readable medium 300 storing instructions for reading data from a storage medium, according to an example of the present subject matter. In one example, the computer readable medium 300 is communicatively coupled to a processing unit 302 over a communication link 304.

For example, the processing unit 302 can be a computing customer device, such as a server, a laptop, a desktop, a mobile customer device, and the like. The computer readable medium 300 can be, for example, an internal memory customer device or an external memory customer device, or any non-transitory computer readable medium. In one implementation, the communication link 304 may be a direct communication link, such as any memory read/write interface. In another implementation, the communication link 304 may be an indirect communication link, such as a network interface. In such a case, the processing unit 302 can access the computer readable medium 300 through a network.

The processing unit 302 and the computer readable medium 300 may also be communicatively coupled to data sources 306 over the network. The data sources 306 can include, for example, databases and computing customer devices. The data sources 306 may be used by the requesters and the agents to communicate with the processing unit 302.

In one implementation, the computer readable medium 300 includes a set of computer readable instructions, such as the data retrieval module 160. The set of computer readable instructions can be accessed by the processing unit 302 through the communication link 304 and subsequently executed to perform acts for reading data on a storage medium.

On execution by the processing unit 302, the data retrieval module 160 may receive a magnetization map of a storage medium from a device, such as the scanning device 100. The magnetization map may be understood as vector map of the storage medium.

Upon receiving the magnetization map, the data retrieval module 160 may perform at least one signal processing technique on the magnetization map to transform the magnetization map into intermediate data. The intermediate data is indicative of a binary format of the magnetization map. In an implementation, an error correction code (ECC) is applied to the intermediate data to rectify any errors that may be present in the intermediate data. Thereafter, the data retrieval module 160 may convert the intermediate data into user data 166 that may be used later. For example, the user data 166 may be written on another generation storage medium. Accordingly, the data retrieval module 160 may convert the intermediate data into the user data 166 by running the intermediate data through a formatter that may be in accordance with the generation of the storage medium loaded in the storage device.

Although implementations for reading data from a storage medium have been described in language specific to structural features and/or methods, it is to be understood that the appended claims are not necessarily limited to the specific features or methods described. Rather, the specific features and methods are disclosed as examples of systems and methods for reading data from a storage medium.

We claim:

1. A data reader comprising:
   a processor; and
   a non-transitory computer-readable medium comprising instructions executable on the processor to:
      receive, from a magnetic media scanning device, a magnetization map of a storage medium that stores data according to a first storage format;
      transform the magnetization map into intermediate data, wherein the intermediate data is indicative of a binary format of the magnetization map; and
      extract user data according to a second storage format from the intermediate data, wherein the second storage format is different from the first storage format and the user data is extracted based on a format emulation of the first storage format of the data stored on the storage medium.

2. The data reader of claim 1, wherein the instructions are executable on the processor to apply error correction code (ECC) to the intermediate data for identifying and correcting errors in the intermediate data.

3. The data reader of claim 1, wherein the instructions are executable on the processor to modify a pitch of the plurality of tracks, based on user input.

4. A magnetic media scanning device comprising:
   a processor;
   at least one magnetization sensor, coupled to the processor, to sense magnetization from a storage medium;
   a magnetic media transport, coupled to the processor, to move the storage medium across the at least one magnetization sensor; and
   a non-transitory computer-readable medium comprising map generation module instructions executable on the processor to cause a scan of at least one section of the storage medium and generation of a magnetization map of data stored on the at least one section of the storage medium for extracting user data, wherein the magnetization map is indicative of a vector map of magnetic media.

5. The magnetic media scanning device of claim 4, wherein the map generation module instructions are executable on the processor to instruct the at least one magnetization sensor to generate the magnetization map.

6. The magnetic media scanning device of claim 4, wherein the map generation module instructions are executable on the processor to instruct the at least one magnetization sensor to scan the storage medium in at least one sample.

7. The magnetic media scanning device of claim 4, wherein the map generation module instructions are executable on the processor to store the magnetization map for later reference.

8. A method for reading data from a storage medium, the method comprising:
   receiving, by a data reader comprising a processor, a magnetization map of the data stored on at least one portion of the storage medium, the data being according to a first storage format, and the magnetization map received from a magnetic media scanning device including a magnetization sensor that read the data;
   analyzing, by the data reader, the magnetization map to identify intermediate data corresponding to the data stored on the at least one portion of the storage medium, wherein the intermediate data represents a binary format of the magnetization map; and
   converting, by the data reader, the intermediate data into user data according to a second storage format based on a format emulation of the first storage format of the storage medium, wherein the second storage format is different from the first storage format, and wherein the converting comprises decrypting the intermediate data.

9. The method of claim 8, further comprising receiving, by the data reader, information of a generation of the storage medium and the first storage format to be emulated.

10. The method of claim 8, wherein the magnetization map is indicative of a vector map of the storage medium, and wherein the vector map depicts magnitude and direction of magnetization of the storage medium at multiple locations.

11. The method of claim 8, wherein the magnetization map is generated by scans by the magnetic media scanning device.

12. The method of claim 11, wherein the scans are taken in the form of samples of the data stored on the storage medium.

13. The method of claim 8, further comprising applying error correction code (ECC) to the intermediate data.

14. The method of claim 8, wherein the format emulation changes a format of the intermediate data corresponding to a generation of the storage medium.

15. A data reader comprising:
a processor; and
a non-transitory computer-readable medium comprising instructions executable on the processor to:
receive a magnetization map of a storage medium, the magnetization map indicative of a pattern of magnetization vectors of the storage medium;
transform the magnetization map into intermediate data by performing at least one signal processing technique on the magnetization map, wherein the magnetization map is transformed into the intermediate data based on the at least one signal processing technique, wherein the intermediate data is indicative of a binary format of the magnetization map;
apply error correction codes (ECC) on the intermediate data; and
convert the intermediate data into user data based on a format emulation of a data storage format of the storage medium.

16. The data reader of claim 1, wherein the instructions are executable on the processor to cause writing of the user data according to the second storage format to a storage device.

17. The data reader of claim 16, wherein the storage device to which the user data according to the second storage format is written is according to a first generation that is different from a second generation of a storage device that wrote the data according to the first storage format to the storage medium.

18. The data reader of claim 17, wherein the second generation is older than the first generation.

19. The method of claim 8, further comprising writing the user data according to the second storage format to a storage device.

20. The method of claim 19, wherein the storage device to which the user data according to the second storage format is written is according to a first generation that is later than a second generation of a storage device that wrote the data according to the first storage format to the storage medium.

* * * * *